US011329863B1

(12) United States Patent
Turgeman et al.

(10) Patent No.: US 11,329,863 B1
(45) Date of Patent: May 10, 2022

(54) SYSTEM, METHOD, AND COMPUTER PROGRAM FOR DYNAMIC PRIORITIZATION OF MONITORING SYSTEM RELATED ALERTS

(71) Applicant: Amdocs Development Limited, Limassol (CY)

(72) Inventors: Lior Turgeman, Moreshet (IL); Erez Gabay, Raanana (IL); Yaniv Avrashi, Petach Tikva (IL); Mihir Parikh, Kakrapar (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/504,314

(22) Filed: Oct. 18, 2021

(51) Int. Cl.
G06F 15/173 (2006.01)
H04L 41/0631 (2022.01)
H04L 41/0604 (2022.01)

(52) U.S. Cl.
CPC ........ H04L 41/065 (2013.01); H04L 41/0609 (2013.01)

(58) Field of Classification Search
CPC .......................... H04L 41/065; H04L 41/0609
See application file for complete search history.

(56) References Cited

U.S. PATENT DOCUMENTS

| 8,098,585 | B2 | 1/2012 | Jiang et al. | |
| 9,521,035 | B2* | 12/2016 | Ganguly | H04L 41/06 |
| 9,601,000 | B1 | 3/2017 | Gruss et al. | |
| 11,153,333 | B1* | 10/2021 | Hermoni | H04L 41/145 |
| 11,190,421 | B1* | 11/2021 | Liu | H04L 41/0604 |
| 11,270,339 | B1* | 3/2022 | Maheswari | G06Q 30/0277 |
| 2018/0349482 | A1* | 12/2018 | Oliner | H04L 41/0681 |
| 2022/0086112 | A1* | 3/2022 | Wunderlich | H04M 3/5183 |

FOREIGN PATENT DOCUMENTS

| CN | 108092816 A | * | 5/2018 | |
| CN | 108243061 A | * | 7/2018 | H04L 41/0609 |
| RU | 2679344 C1 | * | 2/2019 | H04L 12/4641 |
| WO | WO-2011104983 A1 | * | 9/2011 | G06F 11/327 |

OTHER PUBLICATIONS

Alsubhi et al,. "Alert prioritization in intrusion detection systems," NOMS 2008-2008 IEEE Network Operations and Management Symposium, IEEE, 2008, 8 pages.
Noel et al., "Attack graphs for sensor placement, alert prioritization, and attack response," Cyberspace Research Workshop, 2007, 9 pages.

* cited by examiner

Primary Examiner — Richard G Keehn
(74) Attorney, Agent, or Firm — Zilka-Kotab, P.C.

(57) ABSTRACT

As described herein, a system, method, and computer program are provided for dynamic prioritization of monitoring system related alerts. A plurality of alerts generated for a monitoring system are accessed. A first set of alert features predefined as high-level features are identified, wherein each of the high-level features is mapped to one or more alert features in a second set of alert features predefined as low-level features. The plurality of alerts are processed to determine a plurality of the most central high-level features. The plurality of alerts are grouped according to the plurality of the most central high-level features. Each group of alerts is processed to determine a plurality of the most central low-level features for the alerts in the group of alerts. A prioritized set of alerts are selected from the plurality of alerts based on the plurality of the most central low-level features.

20 Claims, 6 Drawing Sheets

SYSTEM, METHOD, AND COMPUTER PROGRAM FOR DYNAMIC PRIORITIZATION OF MONITORING SYSTEM RELATED ALERTS

FIELD OF THE INVENTION

The present invention relates to monitoring and alerting processes for monitoring systems.

BACKGROUND

Monitoring and alerting processes exist for monitoring systems in order to detect events and (potential) issues affecting the system performance. These processes typically analyze events at any level e.g. information technology (IT), infrastructure, application, operation, business, usually in real time, for the purpose of detecting issues and alerting users or other resolution systems of those issues.

However, the highly complex nature of today's modern hybrid IT applications presents an increasing challenge for IT operations teams relying on traditional monitoring approaches. In many cases, investigating an issue in such environments, as to find the root cause is difficult, especially when the root cause is unknown. One of the main challenges in this field is how to efficiently analyze multiple sets of system alert messages stemming from disparate monitoring tools/collectors across the application stack, in real time. In case of a system failure, sifting through all system alerts, or logs, to find the source of a problem can be challenging, especially when time is critical, and the system is flooded with warning and error messages the may or may not be related to the issue at hand. Furthermore, in the current environment where most every alert is deemed "Critical", it is impossible to understand which alerts are most important and should be prioritized for handling (i.e. further analysis, resolution, etc.).

There is thus a need for addressing these and/or other issues associated with the prior art.

SUMMARY

As described herein, a system, method, and computer program are provided for dynamic prioritization of monitoring system related alerts. A plurality of alerts generated for a monitoring system are accessed. A first set of alert features predefined as high-level features are identified, wherein each of the high-level features is mapped to one or more alert features in a second set of alert features predefined as low-level features. The plurality of alerts are processed to determine a plurality of the most central high-level features, wherein each high-level feature of the plurality of the most central high-level features has a corresponding high-level centrality value above a first predefined threshold. The plurality of alerts are grouped according to the plurality of the most central high-level features to form a plurality of groups of alerts. Each group of alerts in the plurality of groups of alerts is processed to determine a plurality of the most central low-level features for the alerts in the group of alerts, wherein each low-level feature of the plurality of the most central low-level features has a corresponding low-level centrality value above a second predefined threshold. A prioritized set of alerts are selected from the plurality of alerts based on the plurality of the most central low-level features.

DETAILED DESCRIPTION

Figure 1:
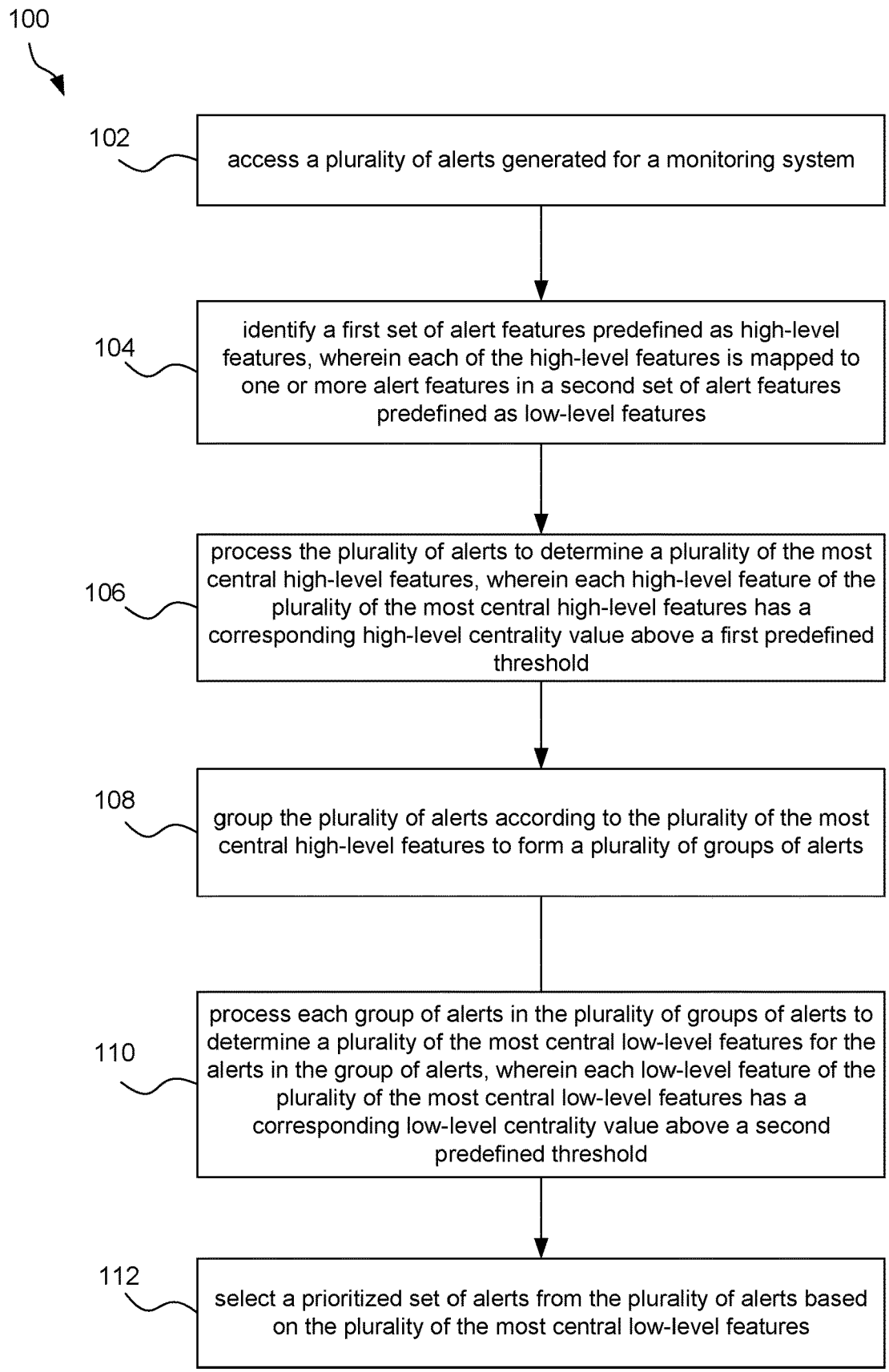
FIG. 1 illustrates a method for dynamic prioritization of monitoring system related alerts, in accordance with one embodiment.

FIG. 1 illustrates a method 100 for dynamic prioritization of monitoring system related alerts, in accordance with one embodiment. The method 100 may be performed by any computer system described below with respect to FIGS. 5 and/or 6. For example, the method 100 may be performed by a computer system used to handle monitoring system related alerts generated by one or more monitoring tools (e.g. systems, applications, etc.).

In one embodiment, the method 100 may be performed in real-time with regard to the generation of the alerts. In another embodiment, the method 100 may be performed on historical data that includes the alerts such that the method 100 may be performed in non-real-time.

In operation 102, a plurality of alerts generated for a monitoring system are accessed. In the context of the present description, an alert for the monitoring system refers to a notification or other type of data that defines an event that occurred in the system. The alert may include features defining the event causing the alert, such as a source application for the event, a source host for the event, a monitored component for the event, a time of the event, etc.

It should be noted that the alerts may be generated by a single monitoring tool that monitors the monitoring system or a plurality of different monitoring tools that monitor the monitoring system. Each monitoring tool may operate to monitor events occurring in the monitoring system and to generate alerts for events that meet predefined conditions. The alerts may indicate anomalies, failures, unwanted activities, or any other types of events occurring in the network that meet the predefined conditions.

In one embodiment, the alerts may be sampled from a larger set of alerts generated for the monitoring system. For example, the alerts may be sampled in accordance with a time window (e.g. defined by a user). In this case, the alerts may be sampled based on their inclusion in the defined time window.

It should also be noted that the alerts may be accessed from any data structure(s) storing alerts generated for the monitoring system (e.g. by the monitoring tool(s)). In one embodiment, the alerts may be streamed or otherwise sent to a local data structure from which they are accessed. In another embodiment, the alerts may be accessed from one or more data structures of the monitoring tool(s).

In operation 104, a first set of alert features predefined as high-level features are identified, wherein each of the high-level features is mapped to one or more alert features in a second set of alert features predefined as low-level features. Thus, various features of the alerts may be defined as high-level features (e.g. source application). Further, each of those high-level features may then be mapped to multiple other features of the alerts that are defined as low-level features.

A user may define the first set of alert features as high-level features, the second set of alert features as low-level features, and the mapping of each of the high-level features to the one or more of the low-level features. Thus, the first set of alert features may be identified from a predefined configuration (e.g. a configuration file).

In operation 106, the plurality of alerts are processed to determine a plurality of the most central high-level features, wherein each high-level feature of the plurality of the most central high-level features has a corresponding high-level centrality value above a first predefined threshold. Thus, a high-level centrality value may be determined for each of the high-level features, and the high-level features with a corresponding high-level centrality value above the first predefined threshold may be determined to be the most central high-level features for the plurality of alerts. In the present description, the "most central" refers to the most significant, connected, etc. features within the plurality of alerts. It should be noted that the first predefined threshold may be defined by the user (e.g. in the configuration file).

In one embodiment, processing the plurality of alerts to determine the plurality of the most central high-level features may include: scanning the plurality of alerts over multiple different time windows to identify a high-level centrality value for each high-level feature per time window, and for each high-level feature, combining the high-level centrality values identified for all of the multiple different time windows to form the corresponding high-level centrality value against which the first predefined threshold is compared. The multiple different time windows are of different sizes scaled by a total size of the plurality of alerts. As another option, combining the high-level centrality values may include averaging the high-level centrality values.

In another embodiment, processing the plurality of alerts to determine the plurality of the most central high-level features may include: calculating a high-level feature histogram for the plurality of alerts, calculating co-occurrences of all possible high-level feature permutations for the plurality of alerts, building a high-level feature network graph based on the high-level feature histogram and the co-occurrences of all possible high-level feature permutations, and applying eigen vector decomposition to the high-level feature network graph to determine the plurality of the most central high-level features.

In operation 108, the plurality of alerts are grouped according to the plurality of the most central high-level features to form a plurality of groups of alerts. In other words, a group is formed for each of the most central high-level features where the group includes the alerts having the most central high-level feature.

In operation 110, each group of alerts in the plurality of groups of alerts is processed to determine a plurality of the most central low-level features for the alerts in the group of alerts, wherein each low-level feature of the plurality of the most central low-level features has a corresponding low-level centrality value above a second predefined threshold. Similar to the predefined threshold for the high-level centrality value, the second predefined threshold may also be defined by the user (e.g. in the configuration file). To this end, the most central low-level features for each of the most central high-level features may be determined.

In one embodiment, processing each group of alerts in the plurality of groups of alerts to determine the plurality of the most central low-level features for the alerts in the group of alerts may include: calculating a low-level feature histogram for the group of alerts, calculating co-occurrences of all possible low-level feature permutations for the group of alerts, building a low-level feature network graph for the group of alerts based on the low-level feature histogram calculated for the group and the co-occurrences of all possible low-level feature permutations calculated for the group of alerts, and applying eigen vector decomposition to the low-level feature network graph to determine the plurality of the most central low-level features for the alerts in the group of alerts.

In another embodiment, processing each group of alerts in the plurality of groups of alerts to determine the plurality of the most central low-level features for the alerts in the group of alerts may include: identifying a low-level centrality value for each low-level feature per high-level feature to which the low-level feature belongs, and for each low-level feature, combining the low-level centrality values identified for all of the high-level features to which the low-level feature belongs to form the corresponding low-level centrality value against which the second predefined threshold is compared.

In operation 112, a prioritized set of alerts are selected from the plurality of alerts based on the plurality of the most central low-level features. In one embodiment, selecting the prioritized set of alerts from the plurality of alerts may include: selecting, as the prioritized set of alerts, one or more alerts from the plurality of alerts having one or more low-level features included in the plurality of the most central low-level features.

To this end, the prioritized set of alerts may be alerts that are representative of all of the alerts in the plurality of alerts generated for the monitoring system, may be the most significant alerts of all of the alerts in the plurality of alerts generated for the monitoring system, and for which priority is to be given (e.g. for further handling, etc.).

In one embodiment, the prioritized set of alerts may also be output. In another embodiment, an indication of the most central high-level features may be output (e.g. in association with the output of the prioritized set of alerts). In yet another embodiment, an indication of the most central low-level features may be output (e.g. in association with the output of the prioritized set of alerts). For example, the prioritized set of alerts may be output for use in resolving one or more issues, failures, etc. in the monitoring system associated with the alerts in the prioritized set of alerts, and/or for further investigating one or more anomalies in the processes associated with the alerts in the prioritized set of alerts.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
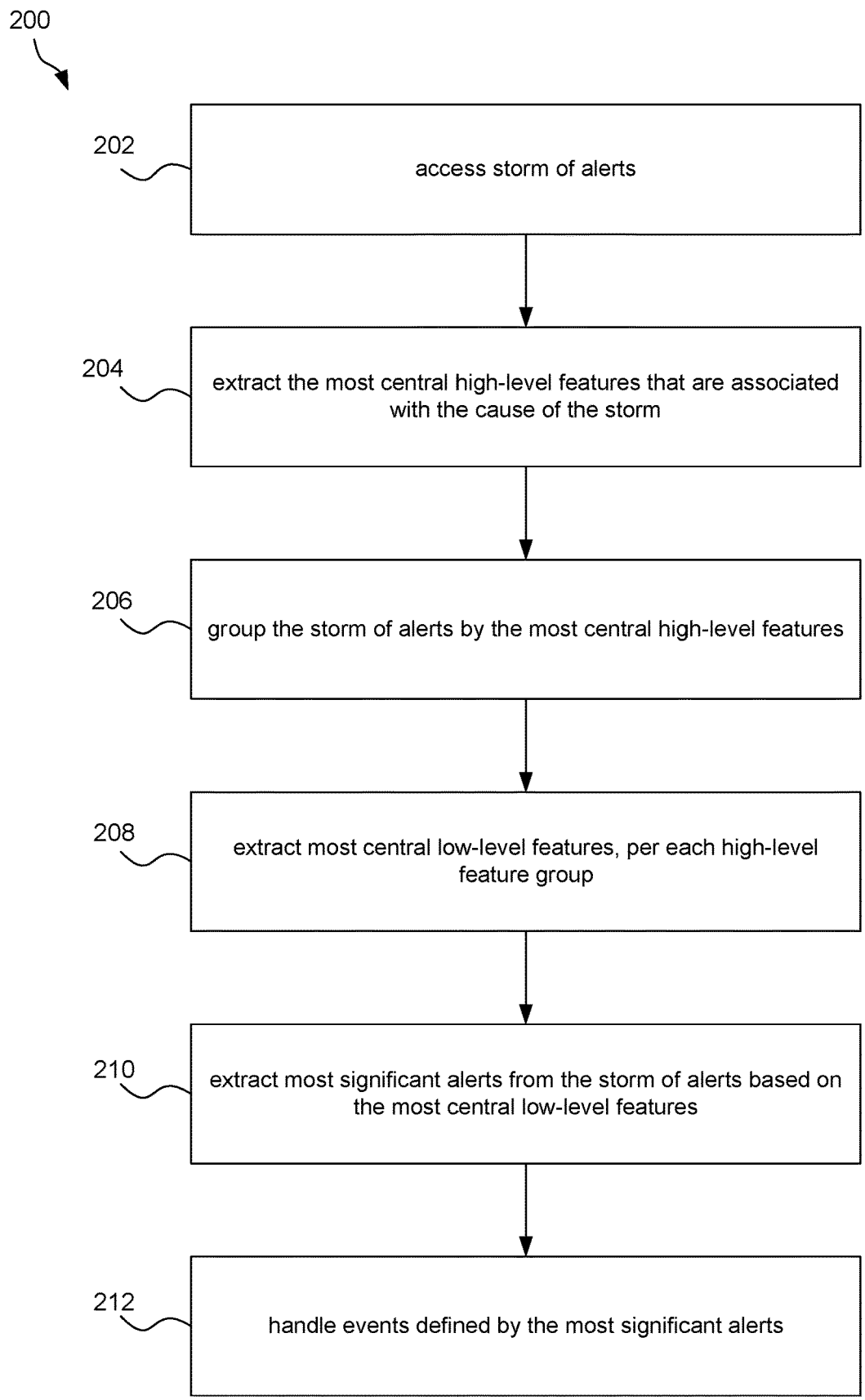
FIG. 2 illustrates a method for extracting significant alerts from a storm of alerts for handling purposes, in accordance with one embodiment.

FIG. 2 illustrates a method 200 for extracting significant alerts from a storm of alerts for handling purposes, in accordance with one embodiment. As an option, the method 200 may be carried out in the context of the details of the previous figure and/or any subsequent figure(s). Of course, however, method 200 may be carried out in the context of any desired environment. Further, the aforementioned definitions may equally apply to the description below.

In operation 202, a storm of alerts is accessed. The "storm" refers to a plurality alerts that are generated for events occurring within a short time window. In one embodiment, the storm may include multiple alerts for a same event, such as when different monitoring tools issue an alert or a same event occurring in the monitoring system. In another embodiment, the storm may include alerts for different, or even unrelated, events.

Figure 3:
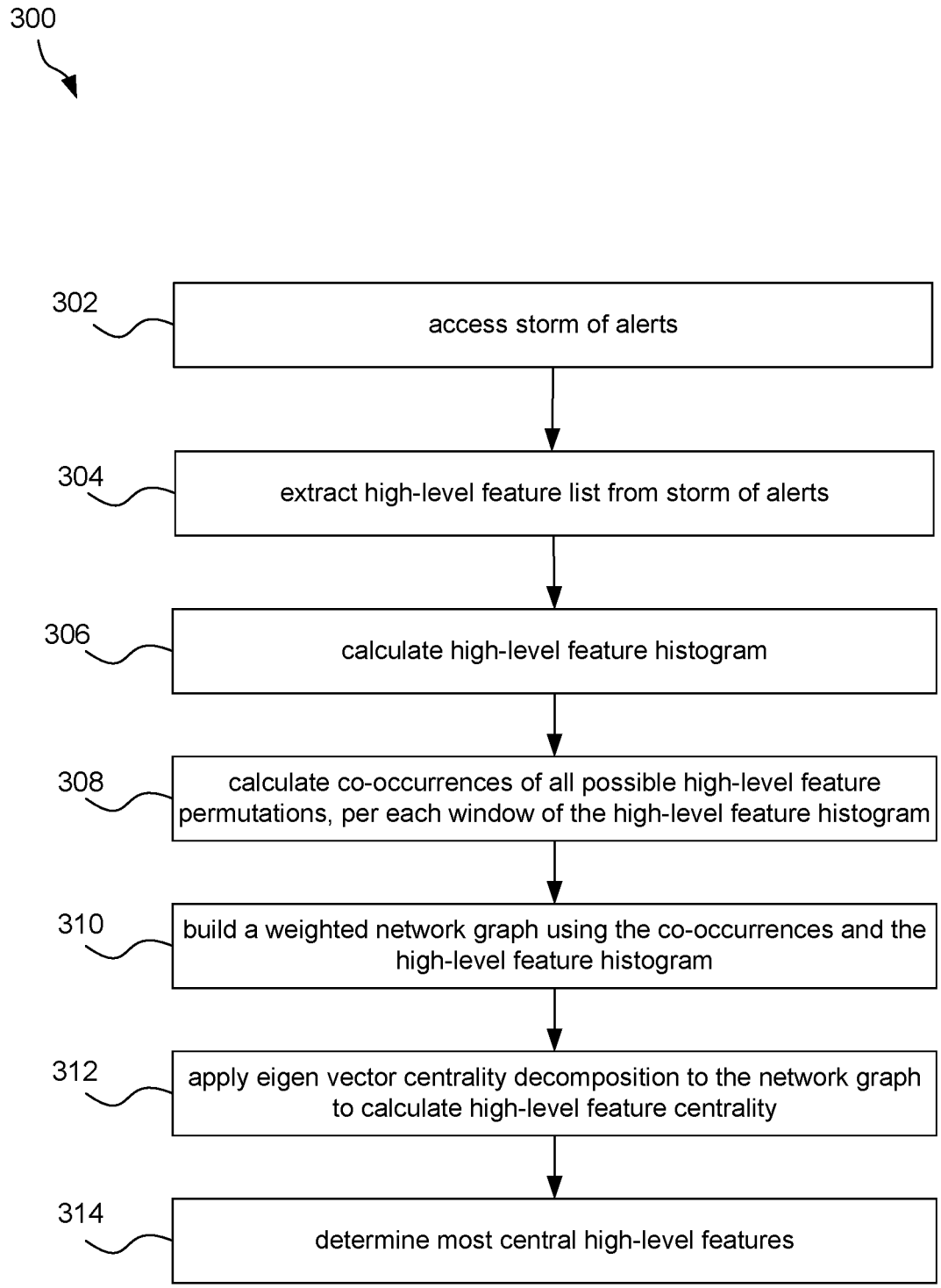
FIG. 3 illustrates a method for determining the most central high-level features in a storm of alerts, in accordance with one embodiment.

In operation 204, the most central high-level features that are associated with a cause of the storm are extracted. For example, eigenvector centrality decomposition may be applied to a high-level network co-occurrence graph in order to extract the most central high-level features that are associated with the cause of the storm. FIG. 3, as described in more detail below, illustrates one method 300 by which the most central high-level features may be extracted from the storm of alerts.

Figure 4:
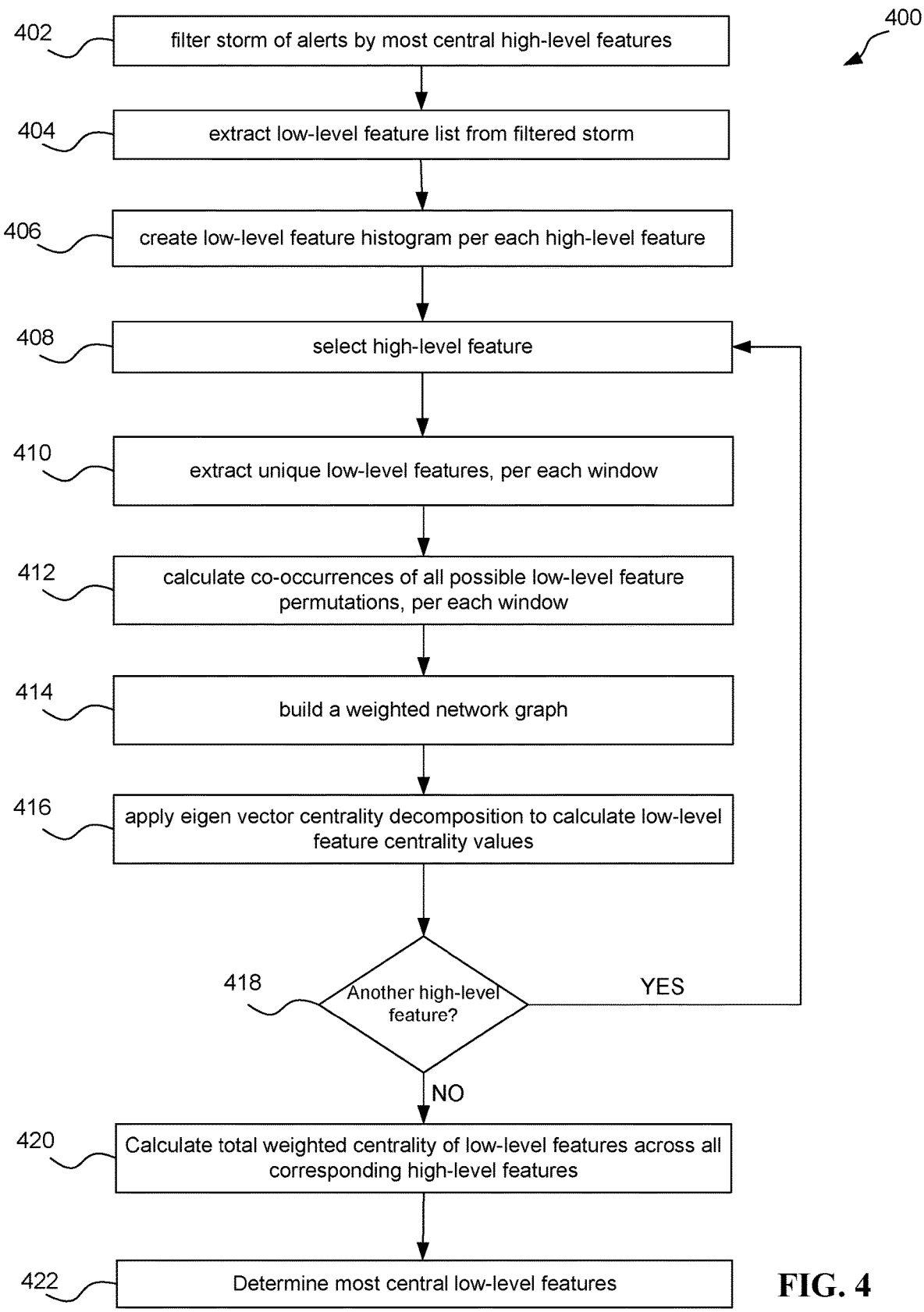
FIG. 4 illustrates a method for determining the most central low-level features in a storm of alerts, in accordance with one embodiment

In operation 206, the storm of alerts are grouped by the most central high-level features. In operation 208, the most central low-level features are extracted, per each high-level feature group. For example, the most central low-level features may be extracted from a low-level co-occurrence network graph generated per each high-level feature resulted group. FIG. 4, as described in more detail below, illustrates one method 400 by which the most central low-level features may be extracted for the alerts in each high-level feature group.

In operation 210, the most significant alerts are extracted from the storm of alerts based on the most central low-level features. For example, the most significant alerts may be extracted by mapping the most highly ranked (weighted) low-level features with the storm data. In operation 212, the events defined by the most significant alerts are handled. In particular, extracting this representative set of alerts, as well as the most significant low-level and high-level features from the storm, may allow for faster handling of the corresponding event and resolving system failures or issues in a relatively short time.

To this end, the present method 200 targets the root noise rather than the root cause, by associating syndromes across events, and scoping them. The method 200 does not require training data, nor prior knowledge of system topology relationships and dependencies. It allows gaining visibility into a set of alerts in both real-time (i.e. in case of a "storm"), but can also be applied post-event (i.e. in non-real-time) to any selected set of alerts.

FIG. 3 illustrates a method 300 for determining the most central high-level features in a storm of alerts, in accordance with one embodiment. As an option, the method 300 may be carried out in the context of the details of the previous figure and/or any subsequent figure(s). For example, the method 300 may be carried out in the context of operation 204 of FIG. 2. Of course, however, method 300 may be carried out in the context of any desired environment. Further, the aforementioned definitions may equally apply to the description below.

In operation 302, a storm of alerts is accessed. In operation 304, a high-level feature list is extracted from the storm of alerts. In operation 306, a high-level feature histogram is calculated. In particular, the high-level feature histogram may be calculated for the alerts based on the high-level feature list.

In operation 308, co-occurrences of all possible high-level feature permutations are calculated for each window of the high-level feature histogram. For example, pairs of feature co-occurrences may be calculated in multiple time windows of the storm, to avoid a distortion of the centrality due to biased features co-occurrences that would otherwise result from using a single predefined window.

In operation 310, a weighted network graph is built using the co-occurrences and the high-level feature histogram. In operation 312, eigen vector centrality decomposition is applied to the weighted network graph to calculate high-level feature centrality. As noted above, to avoid a distortion of the centrality due to biased features co-occurrences as a result of using a single predefined window, the storm may be scanned by using multiple time windows sizes (scaled by the storm length). The centrality value per each high-level feature may then be calculated by averaging over its co-occurrence across those time windows.

In operation 314, the most central high-level features are determined (i.e. based on the high-level feature centrality calculated for each high-level feature). The most central high-level features may include those having a high-level feature centrality value that meets or exceeds a predefined threshold.

FIG. 4 illustrates a method 400 for determining the most central low-level features in a storm of alerts, in accordance with one embodiment. As an option, the method 400 may be carried out in the context of the details of the previous figure and/or any subsequent figure(s). For example, the method 400 may be carried out in the context of operation 208 of FIG. 2. Of course, however, method 400 may be carried out in the context of any desired environment. Further, the aforementioned definitions may equally apply to the description below.

In operation 402, a storm of alerts is filtered by the most central high-level features. In operation 404, a low-level feature list is extracted from the filtered storm. In operation 406, a low-level feature histogram is created per each of the most central high-level features. Thus, the alerts may be grouped by each of the most central high-level features, and a low-level feature histogram may then be created for each group.

In operation 408, one of the most central high-level features is selected, and in operation 410 unique low-level features are extracted from the group corresponding to the selected high-level feature, per window. In operation 412, co-occurrences of all possible low-level feature permutations are calculated, per each window. In operation 414, a weighted network graph is created. The weighted network graph may be created based on the co-occurrences calculated for the group as well as the low-level feature histogram created for the group.

In operation 416, eigen vector centrality decomposition is applied to the weighted network graph to calculate low-level feature centrality. In decision 418, it is determined whether another high-level feature exists for the most central high-level features. When it is determined that another high-level feature exists ("YES" from decision 418), operations 408-416 are repeated for the next high-level feature. Thus, operations 408-416 are repeated for each of the most central high-level features.

When it is determined that another high-level feature does not exist ("NO" from decision 418), a total weighted centrality of low-level features is calculated across all of the corresponding most central high-level features (see operation 420). The total weighted centrality value per each low-level feature may be calculated by weighting its centrality value with its corresponding high-level feature centrality, across all high-level features to which it belongs. The low-level features may then be ranked by their total weighted centrality value.

In operation 422, the most central low-level features are determined (i.e. based on the low-level feature centrality calculated for each low-level feature). The most central low-level features may include those having a low-level feature centrality value that meets or exceeds a predefined threshold. To this end, the most significant low-level features may be extracted from the low-level network graph per each high-level feature resulted group.

Table 1 illustrates exemplary pseudocode for the embodiments described above. Of course, this pseudocode is just one possible implementation of the method 100 of FIG. 1.

TABLE 1

Figure 5:
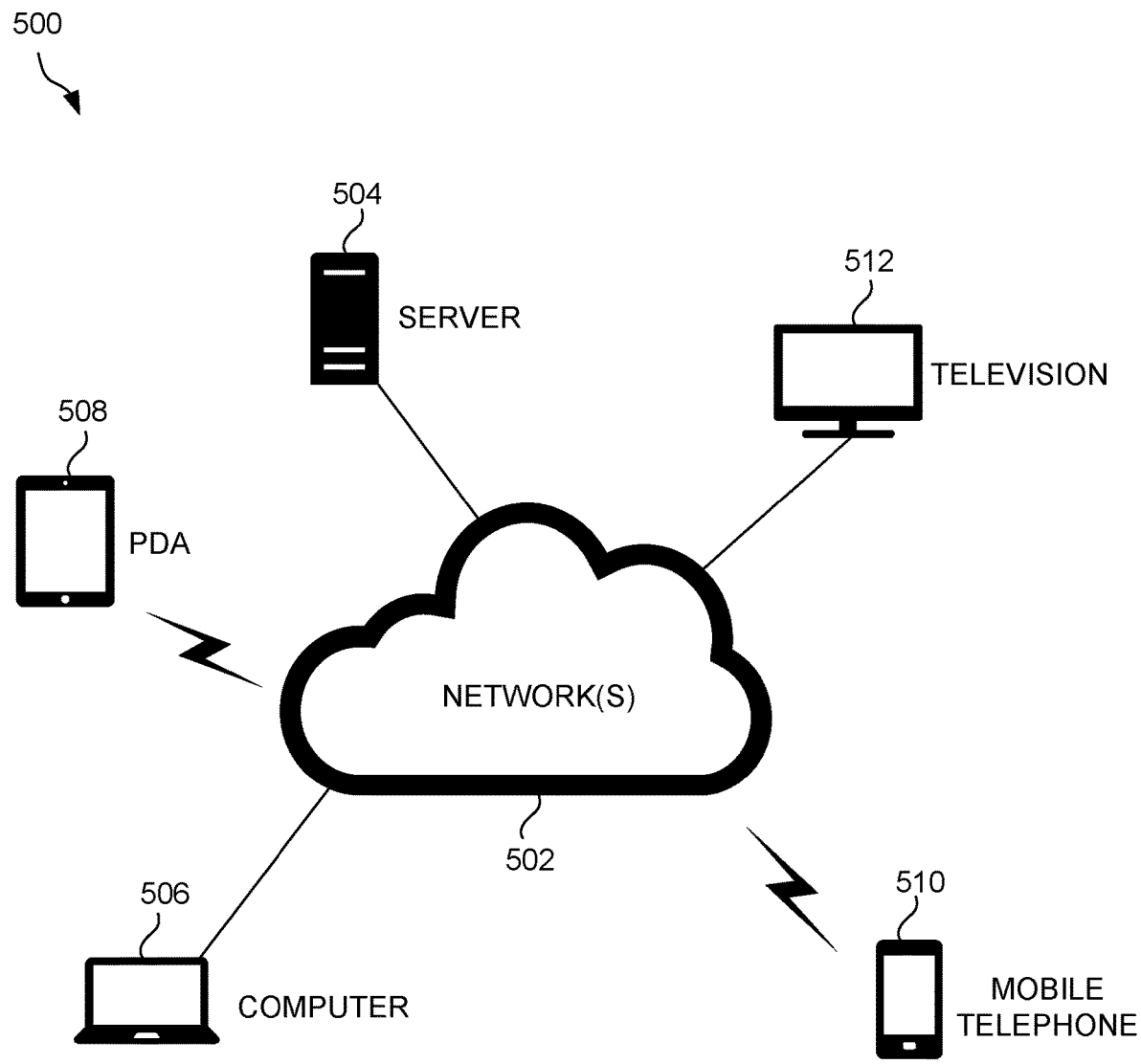
FIG. 5 illustrates a network architecture, in accordance with one possible embodiment.

Input:
  Storm alerts data: SD
    User given parameters: centrality_cutoff, sampling_window_step,
    sliding_window_factor high_level_count_threshold,
    low_level_count_threshold, _level_feature, low_level_feature
Procedure
Phase 1:
  // extract high-level feature list
  Extract $HL_{st}$ from SD
  //calculate high-level feature histogram
  Calculate $HL_{hist}$
  Split $HL_{st}$ based on sampling_window_step, sliding_window_factor:
  $\{HL_i, i=1:n\}$
  For i=1 to n do
    //extract unique high-level features per each window
    extract h1 from $HL_i$: h1 $\subset HL_i$
    //calculate co-occurrences of all possible high-level feature
  permutations, per each window
    calculate $\{(hl_j, hl_k)_{occ}\}_i$ for each $HL_i$:
  //build a weighted network graph (Edges are only added if the
  count is above centrality_cutoff)
  Convert $\{HL_{hist}, \{(hl_j, hl_k)_{occ}\}_i\} \rightarrow HL_{net}$
  //calculate high-level feature centrality values by applying
  EigenVector centrality decomposition to $HL_{net}$
  Calculate $hl_{cen}$ values from $HL_{net}$, Extract $\{hl_{cen}\}_s$
  //filter storm data by most central high-level features
  Filter SDF $\subset$ SD $\{hl_{cen}\}_s$
  For all hl $\subset \{hl_{cen}\}_s$
    //extract low-level feature list from filtered storm data
    Extract $LL_{st}$[hl] from SDF
    // low-level feature histogram per each high-level feature
    Calculate $LL_{hist}$[hl]
    Split $LL_{st}$ based on sampling_window_step,
    sliding_window_factor: $\{LL_i$[hl], i=1:m$\}$
    For i=1 to m do
      //extract unique low-level features per each window
      extract ll from $LL_i$[hl]: ll $\subset LL_i$[hl]
      // calculate co-occurrences of all possible low-level feature
    permutations, per each window
      calculate $\{(ll_j, ll_k)_{occ}\}_i$[hl] for each $LL_i$[hl]
    // build a weighted network graph per each high-level feature
    (Edges are only added if the count is above centrality_cutoff)
    Convert $\{LL_{hist}$[hl], $\{(ll_j, llk)_{occ}\}_i$[hl]$\} \rightarrow LL_{net}$[hl]
    // calculate low-level feature centrality values by applying
    Eigen Vector centrality decomposition to $LL_{net}$[hl]
    Calculate $ll_{cen}$[hl] values from $LL_{net}$[hl], Extract $\{ll_{cen}\}_s$
Phase 2:
  //iterate over most central low-level feature values
  For all ll $\subset \{ll_{cen}\}_s$
  //Calculate total weighted centrality of low-level features across all
  corresponding high-level features
    TWC [ll] = $\Sigma_{hl\ \{hl_{cen}\}_s} \Sigma_{ll} ll_{cen} \cdot hl[ll]_{cen} *freq[ll_{hl}]$
  //Extract most significant low-level features
    Sort ll by TWC [ll], Extract $ll_{sig}$
    //Extract corresponding alerts
    Extract SDF[$ll_{sig}$] $\subset$ SDF
Output:
  $\{hl_{cen}\}_s$, $\{ll_{cen}\}_s$, SDF[$ll_{sig}$]
  most significant high-level features, most significant low-level
features, most significant alerts FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
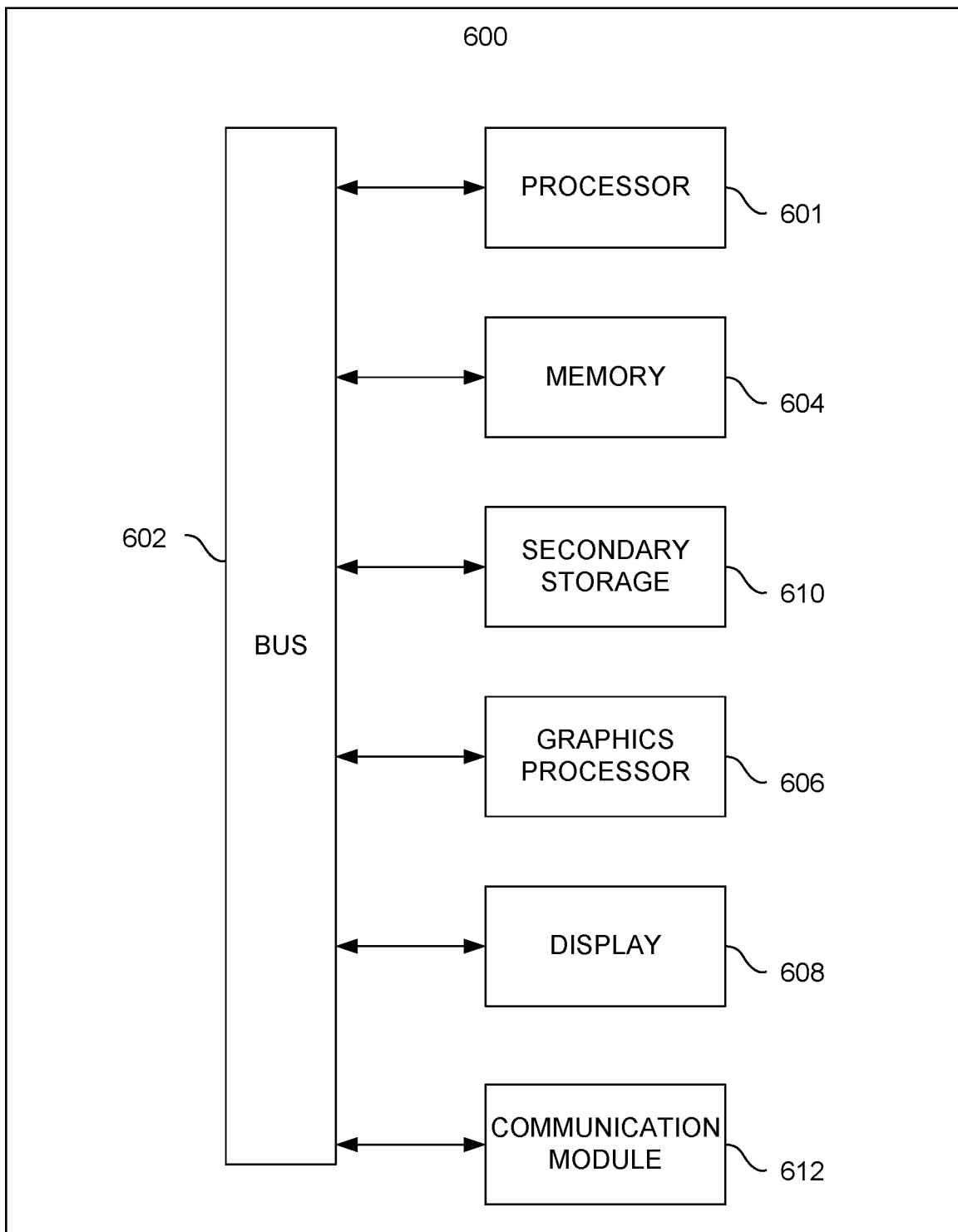
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   access a plurality of alerts generated for a monitoring system;
   identify a first set of alert features predefined as high-level features, wherein each of the high-level features is mapped to one or more alert features in a second set of alert features predefined as low-level features;
   process the plurality of alerts to determine a plurality of the most central high-level features, wherein each high-level feature of the plurality of the most central high-level features has a corresponding high-level centrality value above a first predefined threshold;
   group the plurality of alerts according to the plurality of the most central high-level features to form a plurality of groups of alerts;
   process each group of alerts in the plurality of groups of alerts to determine a plurality of the most central low-level features for the alerts in the group of alerts, wherein each low-level feature of the plurality of the most central low-level features has a corresponding low-level centrality value above a second predefined threshold; and select a prioritized set of alerts from the plurality of alerts based on the plurality of the most central low-level features.

2. The non-transitory computer-readable media of claim 1, wherein each alert in the plurality of alerts includes features defining an event causing the alert, the features including:
   a source application for the event,
   a source host for the event,
   a monitored component for the event; and
   a time of the event.

3. The non-transitory computer-readable media of claim 1, wherein the plurality of alerts are generated by a plurality of different monitoring tools that monitor the monitoring system.

4. The non-transitory computer-readable media of claim 1, wherein the plurality of alerts are sampled from a larger set of alerts generated for the monitoring system based on their inclusion in a defined time window.

5. The non-transitory computer-readable media of claim 1, wherein a user defines:
   the first set of alert features as high-level features,
   the second set of alert features as low-level features,
   the mapping of each of the high-level features to the one or more of the low-level features,
   the first predefined threshold, and
   the second predefined threshold.

6. The non-transitory computer-readable media of claim 1, wherein processing the plurality of alerts to determine the plurality of the most central high-level features includes:
   scanning the plurality of alerts over multiple different time windows to identify a high-level centrality value for each high-level feature per time window, and
   for each high-level feature, combining the high-level centrality values identified for all of the multiple different time windows to form the corresponding high-level centrality value against which the first predefined threshold is compared.

7. The non-transitory computer-readable media of claim 6, wherein the multiple different time windows are of different sizes scaled by a total size of the plurality of alerts.

8. The non-transitory computer-readable media of claim 6, wherein combining the high-level centrality values includes averaging the high-level centrality values.

9. The non-transitory computer-readable media of claim 1, wherein processing the plurality of alerts to determine the plurality of the most central high-level features includes:
   calculating a high-level feature histogram for the plurality of alerts,
   calculating co-occurrences of all possible high-level feature permutations for the plurality of alerts,
   building a high-level feature network graph based on the high-level feature histogram and the co-occurrences of all possible high-level feature permutations,
   applying eigen vector decomposition to the high-level feature network graph to determine the plurality of the most central high-level features.

10. The non-transitory computer-readable media of claim 1, wherein processing each group of alerts in the plurality of groups of alerts to determine the plurality of the most central low-level features for the alerts in the group of alerts includes:
   calculating a low-level feature histogram for the group of alerts,
   calculating co-occurrences of all possible low-level feature permutations for the group of alerts,
   building a low-level feature network graph for the group of alerts based on the low-level feature histogram calculated for the group and the co-occurrences of all possible low-level feature permutations calculated for the group of alerts,
   applying eigen vector decomposition to the low-level feature network graph to determine the plurality of the most central low-level features for the alerts in the group of alerts.

11. The non-transitory computer-readable media of claim 1, wherein processing each group of alerts in the plurality of groups of alerts to determine the plurality of the most central low-level features for the alerts in the group of alerts includes:
   identifying a low-level centrality value for each low-level feature per high-level feature to which the low-level feature belongs, and
   for each low-level feature, combining the low-level centrality values identified for all of the high-level features to which the low-level feature belongs to form the corresponding low-level centrality value against which the second predefined threshold is compared.

12. The non-transitory computer-readable media of claim 1, wherein selecting the prioritized set of alerts from the plurality of alerts includes:
   selecting, as the prioritized set of alerts, one or more alerts from the plurality of alerts having one or more low-level features included in the plurality of the most central low-level features.

13. The non-transitory computer-readable media of claim 1, wherein the computer instructions, when executed by the one or more processors of the device, further cause the device to:
   output the prioritized set of alerts.

14. The non-transitory computer-readable media of claim 13, wherein the computer instructions, when executed by the one or more processors of the device, further cause the device to:
   output an indication of the most central high-level features.

15. The non-transitory computer-readable media of claim 13, wherein the computer instructions, when executed by the one or more processors of the device, further cause the device to:
   output an indication of the most central low-level features.

16. The non-transitory computer-readable media of claim 13, wherein the prioritized set of alerts are output for use in resolving one or more issues in the monitoring system associated with the alerts in the prioritized set of alerts.

17. A method, comprising:
   at a computer system:
   accessing a plurality of alerts generated for a monitoring system;
   identifying a first set of alert features predefined as high-level features, wherein each of the high-level features is mapped to one or more alert features in a second set of alert features predefined as low-level features;
   processing the plurality of alerts to determine a plurality of the most central high-level features, wherein each high-level feature of the plurality of the most central high-level features has a corresponding high-level centrality value above a first predefined threshold;
   grouping the plurality of alerts according to the plurality of the most central high-level features to form a plurality of groups of alerts;

processing each group of alerts in the plurality of groups of alerts to determine a plurality of the most central low-level features for the alerts in the group of alerts, wherein each low-level feature of the plurality of the most central low-level features has a corresponding low-level centrality value above a second predefined threshold;

selecting a prioritized set of alerts from the plurality of alerts based on the plurality of the most central low-level features.

18. The method of claim 17, wherein the method is performed in real-time with regard to the generation of the plurality of alerts.

19. The method of claim 17, wherein the method is performed on historical data that includes the plurality of alerts such that the method is performed in non-real-time.

20. A system, comprising:
a non-transitory memory storing instructions; and
one or more processors in communication with the non-transitory memory that execute the instructions to:
access a plurality of alerts generated for a monitoring system;
identify a first set of alert features predefined as high-level features, wherein each of the high-level features is mapped to one or more alert features in a second set of alert features predefined as low-level features;
process the plurality of alerts to determine a plurality of the most central high-level features, wherein each high-level feature of the plurality of the most central high-level features has a corresponding high-level centrality value above a first predefined threshold;
group the plurality of alerts according to the plurality of the most central high-level features to form a plurality of groups of alerts;
process each group of alerts in the plurality of groups of alerts to determine a plurality of the most central low-level features for the alerts in the group of alerts, wherein each low-level feature of the plurality of the most central low-level features has a corresponding low-level centrality value above a second predefined threshold; and
select a prioritized set of alerts from the plurality of alerts based on the plurality of the most central low-level features.

\* \* \* \* \*